(12) United States Patent
Hanes

(10) Patent No.: US 7,532,553 B2
(45) Date of Patent: May 12, 2009

(54) COMPUTER-READABLE MEDIUM AND METHOD FOR CONFIGURING A DIGITAL VERSATILE DISC RE-WRITEABLE DEVICE

(75) Inventor: David H. Hanes, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 524 days.

(21) Appl. No.: 10/335,318

(22) Filed: Dec. 31, 2002

(65) Prior Publication Data
US 2004/0125721 A1    Jul. 1, 2004

(51) Int. Cl.
*G11B 15/04*    (2006.01)
(52) U.S. Cl. .................. 369/53.22; 369/59.25
(58) Field of Classification Search ............. 369/53.22
See application file for complete search history.

(56) References Cited

U.S. PATENT DOCUMENTS

| | | | | |
|---|---|---|---|---|
| 5,818,812 A | * | 10/1998 | Moribe et al. | 369/47.15 |
| 6,330,210 B1 | * | 12/2001 | Weirauch et al. | 369/30.11 |
| 6,608,804 B2 | * | 8/2003 | Shim | 369/53.22 |
| 6,671,249 B2 | * | 12/2003 | Horie | 369/275.3 |
| 7,164,633 B2 | * | 1/2007 | Iida et al. | 369/47.27 |
| 2001/0007545 A1 | * | 7/2001 | Ueda et al. | 369/47.15 |

\* cited by examiner

*Primary Examiner*—Wayne R Young
*Assistant Examiner*—Adam R Giesy

(57) ABSTRACT

A method of writing data to an optical disc comprising determining a disc category value to be written to an optical disc, and writing, by an optical disc drive, the disc category value to the optical disc, the disc category value written to the optical disc different than a standardized disc category value associated with a disc category type of the optical disc is provided. A computer-readable medium having stored thereon an instruction set to be executed, the instruction set, when executed by a processor, causes the processor to perform a computer method of determining an optical disc category value, and writing, by an optical disc drive, the disc category value to an optical disc, the disc category value written to the optical disc different than a standardized disc category value associated with a disc category type of the optical disc is provided.

23 Claims, 2 Drawing Sheets

COMPUTER-READABLE MEDIUM AND METHOD FOR CONFIGURING A DIGITAL VERSATILE DISC RE-WRITEABLE DEVICE

TECHNICAL FIELD OF THE INVENTION

This invention relates to optical storage technologies and, more particularly, to a computer-readable medium and method for configuring a digital versatile disc re-writeable drive.

BACKGROUND OF THE INVENTION

Numerous types of optical discs exist for storing digital data for later playback thereof. Optical discs, such as compact disc read-only memories (CD-ROMs) and digital versatile disc read-only memories (DVD-ROM), are manufactured with data stamped into a layer(s) of the disc. Recordable optical discs, such as recordable compact discs and recordable digital versatile discs, utilize photosensitive dyes, or other suitable chemicals, that are modified by application of a particular wavelength of light during a disc write procedure. A recordable CD and DVD are created on a respective writeable CD and DVD drive and are readable on conventional CD- and DVD-drive devices, respectively. A re-writeable CD and DVD may have data written thereto multiple times by a re-writeable CD- and DVD-drive, respectively.

Recordable DVDs provide improved capacity and bandwidth compared to recordable CDs. Recordable DVDs are supplanting recordable CDs as the favored optical storage medium among consumer optical electronics technologies due to the improved capacity and relative inexpense of recordable DVDs and DVD drives. Re-writeable DVDs have the added advantage of being able to be repeatedly written to. However, reading of a re-writeable DVD by another type of DVD-drive, such as a DVD-ROM drive or a set top DVD movie player, is sometimes problematic due to various drive types having the inability to recognize the re-writeable media type.

SUMMARY OF THE INVENTION

Heretofore, a system and method for invoking a disc category overwrite mode in a re-writeable optical disc drive for facilitating reading of a re-writeable optical disc by another optical disc drive has not been provided.

In accordance with an embodiment of the present invention, a method of writing data to an optical disc comprising determining a disc category value to be written to an optical disc, and writing, by an optical disc drive, the disc category value to the optical disc, the disc category value written to the optical disc different than a standardized disc category value associated with a disc category type of the optical disc is provided.

In accordance with another embodiment of the present invention, a computer-readable medium having stored thereon an instruction set to be executed, the instruction set, when executed by a processor, causes the processor to perform a computer method of determining an optical disc category value, and writing, by an optical disc drive, the disc category value to an optical disc, the disc category value written to the optical disc different than a standardized disc category value associated with a disc category type of the optical disc is provided.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE DRAWINGS

Figure 1:
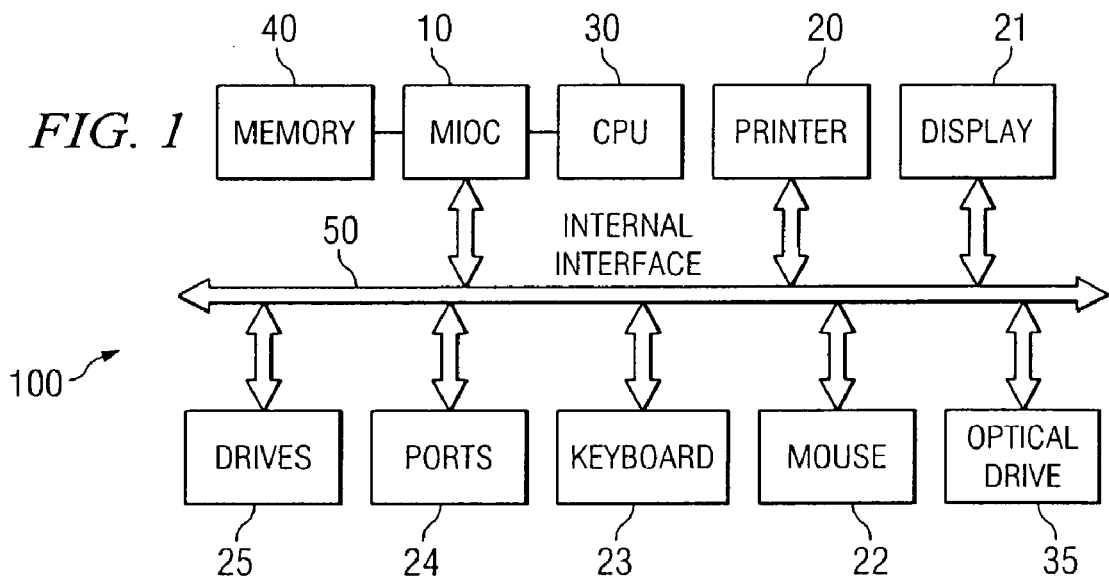
FIG. 1 is a simplified block diagram of a computer system that may include a re-writeable optical drive according to an embodiment of the present invention.
Figure 2:
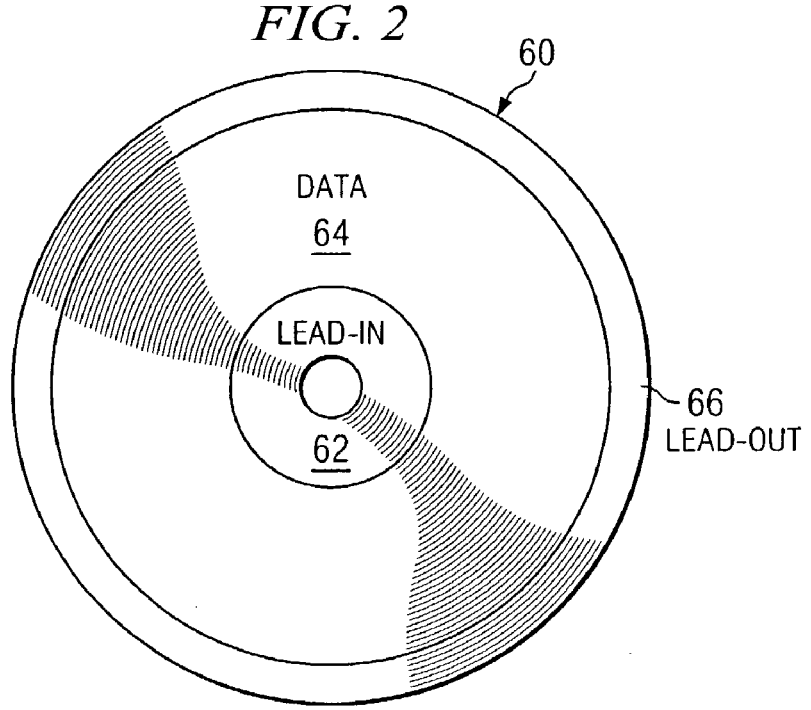
FIG. 2 is a schematic of a digital versatile disc comprising a lead-in area, a data area, and a lead-out area in which embodiments of the present invention may be implemented to advantage.
Figure 3:
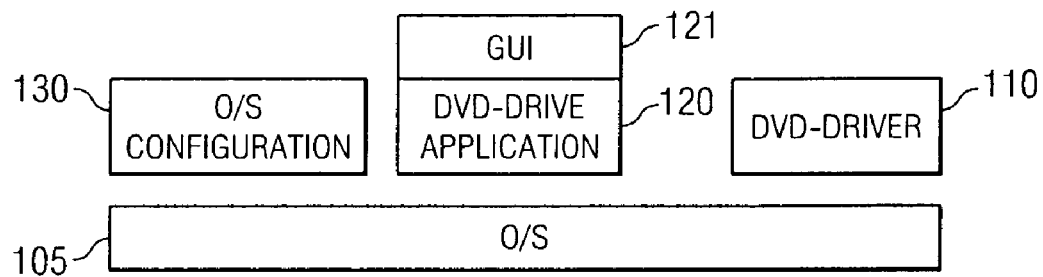
FIG. 3 is a schematic of an application configuration in which an embodiment of the present invention may be implemented.

The preferred embodiment of the present invention and its advantages are best understood by referring to FIGS. 1 through 3 of the drawings, like numerals being used for like and corresponding parts of the various drawings.

FIG. 1 is a simplified block diagram of a computer system 100 that may include a re-writeable optical drive according to an embodiment of the present invention. Computer system 100 comprises one or more central processing units 30 connected to a memory and input/output controller (MIOC) 10 via a system bus. MIOC 10 receives access requests over a system bus and addresses memory devices 40 and/or other I/O devices, for example a printer 20, a display 21, input devices such as a mouse 22 or keyboard 23, I/O ports 24, and storage devices 25, communicatively coupled with MIOC 10 via a local interface 50, such as one or more system buses (e.g., a peripheral component interconnect (PCI) local bus, an integrated device electronics (IDE) interface, or another suitable interface), in order to process memory access requests. Memory devices 40 may be implemented as non-volatile storage, such as a read only memory (ROM), and/or a volatile storage, such as a random-access memory (RAM), a dynamic random-access memory, a flash electrically-erasable programmable read only memory, and/or another storage device.

DVDs, as well as DVD drives, may be categorized according to the read/write capabilities thereof. For example, a read-only DVD (DVD-ROM) may be read by a DVD-ROM drive or a DVD drive having write capabilities. A recordable DVD generally refers to a write-once DVD that may be read by a DVD-ROM drive or a recordable DVD-drive. A re-writeable DVD-drive is capable of writing multiple times to a re-writeable DVD. In an exemplary embodiment, computer system 100 comprises a re-writeable DVD-drive 35 operable to read data from, and write data to, a re-writeable DVD. As mentioned above, a DVD having content written thereto by a re-writeable DVD drive may not be recognizable by other DVD players, such as a DVD-ROM drive and/or a set-top DVD video player.

DVDs, whether read-only, recordable, or re-writeable, generally comprise three data regions: a lead-in area 62, a data area 64, and a lead-out area 66 as shown by the illustrative schematic of a DVD 60 in FIG. 2 and in which embodiments of the present invention may be implemented to advantage. Lead-in and lead-out areas 62 and 66 indicate the playback area boundaries and may comprise various data that facilitates playback by the DVD-drive. In TABLE A, there is summary of a typical lead-in area 62 of a DVD.

TABLE A

| Zone | Start PSN (h) | Length (d) |
| --- | --- | --- |
| Initial Zone | 01D830 | 52,304 (nominal) |
| Inner Disc Test Zone | 02A480 | 2,048 |
| Inner Drive Test Zone | 02AC80 | 12,288 |
| Guard Zone 1 | 02DC80 | 512 |
| Replacement Zone 1 | 02DE80 | 4,096 |
| DMA Zone 1 | 02EE80 | 64 |
| Inner Disc Identification Zone | 02EEC0 | 256 |
| DMA Zone 2 | 02EFC0 | 64 |
| Reference Code Zone | 02F000 | 32 |
| Buffer Zone 1 | 02F020 | 480 |
| Control Data Zone | 02F200 | 3,072 |
| Buffer Zone 2 | 02FE00 | 512 |

A recordable or re-writeable DVD having content written thereto by a recordable DVD drive is preferably readable by all DVD drive types, e.g., DVD-ROM and set top DVD movie players. However, certain data that is written to a re-writeable DVD during writing of content by a re-writeable DVD-drive may render the re-writeable DVD unreadable for playback by another DVD drive type. The control data zone of the lead-in area is particularly problematic with regard to the readability of a re-writeable DVD. The control data zone includes various data fields comprising physical format information, disc manufacturing information, and content provider information. The physical format information field includes a disc category and version number field. The disc category field value corresponding to a re-writeable DVD is unrecognizable by various DVD drives and may result in an inability to read a re-writeable DVD for playback.

The disc category field may have one of various values written thereto dependent on the DVD type. Some DVD disc category field values are summarized below in TABLE B. The disc category values summarized in TABLE B represent standardized values respectively associated with the particular DVD types identified. The embodiments of the present invention facilitate playback of a DVD, having content written thereto by a re-writeable DVD device, on other DVD drive types and on different device models by enabling a user to manipulate the disc category value that is written to a re-writeable DVD. In the most general terms, the present invention provides a technique for configuring a disc drive to write a disc category value to a DVD (or other optical disc format) that is different than a standardized disc category associated with the DVD based on the DVD type. Re-writeable DVDs conforming to DVD+RW standards created without benefit of the teachings of the present invention have a disc category of 1001 (binary) and a version number of 0010 (binary) written to the disc category field and version number field, respectively, of the lead-in area. That is, conventionally created re-writeable DVD+RWs have a value of 92-hexadecimal written to the byte of the lead-in area that comprises the disc category and version number fields. In a preferred embodiment, the user is able to set drive 35 in a mode in which DVD+RWs created thereby have a disc category value corresponding to a DVD-ROM such that recognition errors are not generated when the DVD+RW is read from other DVD drives.

TABLE B

| Disc Category | Name |
| --- | --- |
| 0000b | DVD-ROM |
| 0001b | DVD-RAM |
| 0010b | recordable DVD |
| 1001b | DVD + RW |
| Others | Reserved |

FIG. 3 is a schematic of an application configuration in which an embodiment of the present invention may be implemented. An operating system (O/S) 105 performs functionality similar to conventional operating systems, e.g., controls the resources of computer system 100 and interfaces the instructions of various applications with processing element 30 as necessary to enable the applications to properly run. A DVD driver 110 is operable to receive commands and/or data directed to drive 35 and perform conversion thereon such that the commands and/or data are recognizable by drive 35. A DVD drive application 120 facilitates a mode selection by a user of computer system 100 by providing a disc category mode selection input operation to the user according to an embodiment of the present invention. The mode selection input may be made, for example, through a graphical user interface (GUI) 121 interfaced with DVD drive application 120. In an exemplary embodiment, two modes are provided from which a user may provide an input indicative of a mode selection and are referred to herein as a conventional mode and a disc category overwrite mode. Selection of the conventional mode causes DVD drive application 120 to configure re-writeable DVD drive 35 in a conventional configuration. The disc category written to a re-writeable DVD created when drive 35 is configured to operate in the conventional mode is unaffected. Accordingly, the disc category and version number field written to a re-writeable DVD (conforming to the DVD+RW standard) is 92 hexadecimal when configured in the conventional mode. However, selection of the disc category overwrite mode by the user results in drive 35 advantageously writing a disc category value corresponding to a ROM-type DVD, that is a disc category of 0000 (binary), to a re-writeable DVD. Preferably, a version number of 1 is written to the version number field of the lead-in area 62 when re-writeable DVD drive 35 is configured in the disc category overwrite mode, i.e., a disc category value of binary 0 and a version number of binary 1 (hexadecimal 1) is preferably written to the byte of the lead-in area 62 comprising the disc category and version number fields. A disc category and version number value of hexadecimal 1 is recognizable by most DVD drive devices (including both DVD-RW drives and DVD+RW drives) and, accordingly, DVD drives that are unable to recognize a re-writeable DVD disc category may recognize and read a re-writeable DVD created in the disc category overwrite mode.

Figure 4:
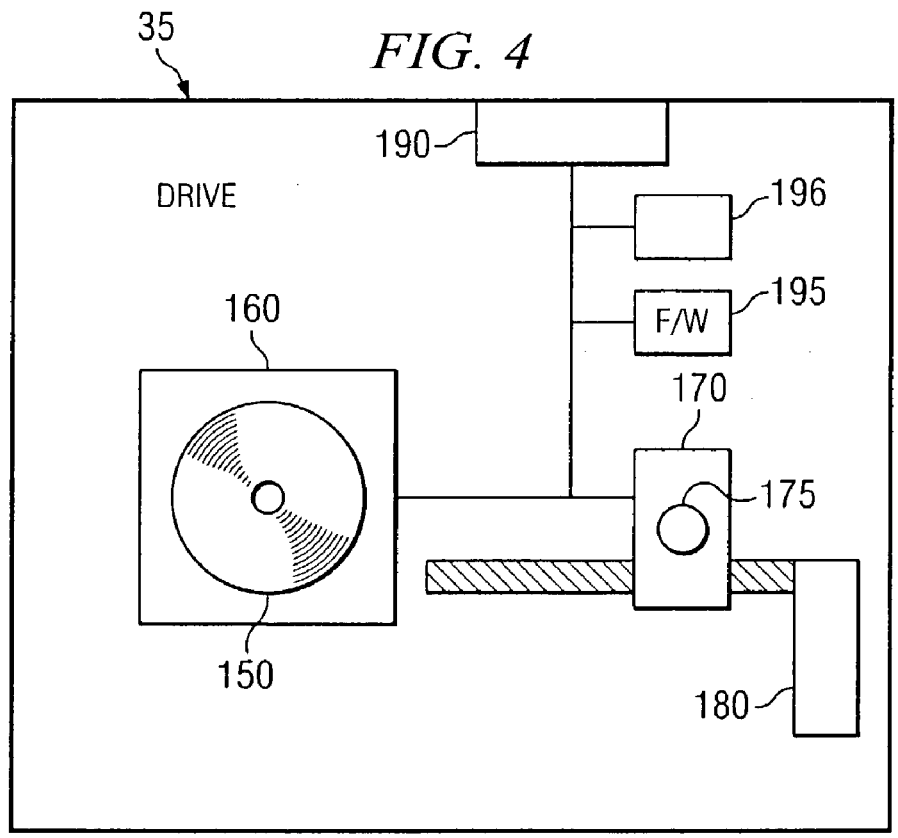
FIG. 4 is a simplified block diagram of re-writeable digital versatile disc drive that may be configured to operate in a conventional mode or a disc category overwrite mode according to an embodiment of the present invention.

With reference now to FIG. 4, there is a simplified block diagram of re-writeable DVD drive 35 that may be configured to operate in a conventional mode or a disc category overwrite mode according to an embodiment of the present invention. Re-writeable DVD drive 35, in general, comprises a disc drive 150 powered by a drive motor 160 electrically coupled therewith and a laser transmitter and pickup apparatus 170 for generating a light and impinging the light on a re-writeable DVD. A laser lens 175 may be used to focus the light on the target data track. A tracking apparatus 180 facilitates translation of laser transmitter and pickup apparatus 170 and lens 175 across the surface of a DVD such that the light directed from laser transmitter and pickup apparatus 170 may properly focus on a data track. Laser transmitter and pickup apparatus 170 includes an optical receiver operable to detect differences in light reflected from the re-writeable DVD and performs a binary interpretation dependent on reflected light characteristics. Re-writeable DVD drive 35 also comprises an input/output interface 190, such as an integrated drive electronics (IDE) interface, a universal serial bus (USB) interface, or another suitable peripheral interface, for receiving and transmitting data from and to other computer system devices. Re-writeable DVD drive 35 may also include a firmware unit 195, such as an electrically-erasable programmable read-only memory (EEPROM), and a storage device 196, such as a random access memory apparatus.

DVD drive application 120 may be implemented as a DVD-writer application operable to communicate with drive 35 and that facilitates creation, editing, and/or other manipulation of media, such as audio, video, and/or data, to be written to a re-writeable DVD. Preferably, DVD drive application 120 is operable to receive a disc category mode select input indicative of a user preference of conventional mode or disc category overwrite mode. DVD drive application 120 may configure re-writeable DVD drive 35 to operate in the conventional mode or, alternatively, in the disc category overwrite mode.

DVD drive application 120 may be invoked by a user of computer system 100 and is operable to receive a disc category mode input therefrom. For example, the user may provide the mode input via an input device, such as mouse 22, keyboard 23, or another suitable input device. The mode input is conveyed to DVD drive application 120 via internal interface 50 and disc category configuration commands associated with the particular mode input are, in turn, supplied to drive 35.

In one embodiment, an overwrite mode input is supplied to DVD drive application 120 on a non-persistent basis. That is, disc category overwrite configuration commands are supplied to re-writeable DVD drive 35 each time system 100 is booted if disc category overwrites are to be performed. In the non-persistent mode, re-writeable DVD drive 35 will perform conventional disc category writes to the lead-in area 62 of a DVD unless the user supplies a disc category overwrite mode input to DVD drive application 120 prior to writing of the re-writeable DVD. DVD drive application 120 may then supply category overwrite configuration command(s) to re-writeable DVD drive 35 on a non-persistent basis. Thereafter, re-writeable DVD drive 35 may then write an overwrite category, that is a disc category value different than that associated with the disc type being written to, into the disc category field of the lead-in area 62 of the re-writeable DVD. Re-writeable DVD drive 35 reverts to performing conventional disc category writes to the disc category field of the DVD for writes performed to DVDs after a subsequent system boot unless the user again supplies a disc category overwrite mode input to DVD drive application 120. Additionally, conventional category writes to the disc category field of the DVD are performed if a drive reset is performed.

In another embodiment, re-writeable DVD drive 35 may be supplied with a disc category overwrite configuration command that is written into firmware unit 195 of re-writeable DVD drive 35. The configuration command written into firmware unit 195 provides logic instructions that cause re-writeable DVD drive 35 to operate in the disc category overwrite mode on a persistent basis. That is, when re-writeable DVD drive 35 is firmware configured for operation in the disc category overwrite mode, operation thereof remains in the disc category overwrite mode until a conventional disc category mode configuration command is subsequently written to firmware unit 195. A conventional disc category mode input is supplied to application 120 by the user of computer system 100 via any one of various input devices. Although performing a firmware disc category overwrite configuration (or alternatively a firmware conventional disc category configuration) of re-writeable DVD drive 35 enables the drive to remain configured over multiple system boots, the number of times such a configuration may be performed is limited to the number of times a write operation may be made to firmware unit 195.

In another embodiment of the present invention, a software persistent overwrite mode may be invoked by the user of computer system 100 without performing a firmware write to firmware unit 195. DVDs written to by re-writeable DVD drive 35 have a disc category overwrite written thereto after an overwrite mode input is supplied to DVD drive application 120 until a conventional mode input is supplied by the user or a drive reset is encountered. Configuration of re-writeable DVD drive 35 in the disc category overwrite mode is maintained over multiple system boots without additional user input other than supply of the initial overwrite mode input. Preferably, an O/S configuration file 130 in which configuration data of DVD drive application 120 may be written is readable by application 120. The contents of O/S configuration file 130 are preferably loaded by O/S 105 during system boot and DVD drive application 120 is accordingly configured in an overwrite mode after each subsequent system boot upon instantiation of application 120. In a particular implementation, O/S 105 is embodied as a MICROSOFT WINDOWS operating system and configuration file 130 may be implemented as the well-known WINDOWS registry. Moreover, in the software persistent overwrite mode, DVD drive application 120 may be included within a boot batch file that is executed during system startup. For example, application 120 may be included within the 'run' key of the WINDOWS registry so that application 120 is invoked at system startup and application 120 is configured in the software persistent overwrite mode each time computer system 100 is booted thereby alleviating user interaction or input required to configure re-writeable DVD drive 35 in the software persistent overwrite mode for subsequent system boots. The user may supply a conventional mode input to application 120 if a conventional disc category write to a re-writeable DVD is desired. Advantageously, configuration of re-writeable DVD drive 35 in the software persistent overwrite mode eliminates firmware configuration writes. Accordingly, re-writeable DVD drive 35 may be alternatively configured in a disc category overwrite mode and conventional mode an unlimited number of times. Notably, the present invention may be used to re-write a disc category on a re-writeable DVD that has previously had data written thereto. Drive 35 may then erase any disc category value previously written to a re-writeable DVD and re-write the disc category according to the category overwrite configuration command.

Application 120 determines (by reading a disc category mode from configuration file 130, by supply of user input, or by another process) a disc category value to be supplied to DVD drive 35 for writing to a DVD. Thus, application 120 may be configured to direct DVD drive 35 to write a disc category value associated with the DVD-type or, alternatively, application 120 may be configured to write a disc category value that is different than a standardized disc category value associated with the DVD type. It should be understood that a standardized disc category value (such as those described in TABLE B) associated with a particular DVD type may be a de facto standard or may be mandated by a standards body.

DVD drive application 120 is preferably implemented as an instruction set(s), or program, of computer-readable logic. The instruction set is preferably maintained on any one of various conventional computer-readable mediums. While the present invention has been described with reference to a DVD and a DVD drive, it should be understood that the embodiments of the invention may be applied to other optical disc storage technologies and the description herein is provided to facilitate an understanding of the invention. Moreover, the present invention has been described with reference to a DVD formatted in accordance with the DVD+RW standard. However, the invention is not limited to implementation on disc of a particular format and may be similarly implemented on a DVD formatted in a standard different than the DVD+RW standard, such as DVD–RW.

What is claimed is:

1. A method of writing data to an optical disc, comprising:
    determining a disc category value to be written to an optical disc, comprises storing an optical disc category mode configuration setting in an operating system configuration file loaded by an operating system during a computer system boot-up; and
    writing, by an optical disc drive, the disc category value to the optical disc, the disc category value written to the optical disc different than a disc category value associated with a disc category type of the optical disc.

2. The method according to claim 1, wherein writing, by the optical disc drive, a disc category value to the optical disc further comprises writing, by a writeable digital versatile disc drive, the disc category value to a writeable digital versatile disc.

3. The method according to claim 2, wherein writing, by a writeable digital versatile disc drive, the disc category value to a writeable digital versatile disc further comprises writing, by a re-writeable digital versatile disc drive, the disc category value to a re-writeable digital versatile disc.

4. The method according to claim 1, wherein writing a disc category value to the optical disc further comprises writing the disc category value into a lead-in area of the optical disc.

5. The method according to claim 4, wherein writing the disc category value into the lead-in area further comprises writing the disc category value into a disc category field of a control data zone of the lead-in area.

6. The method according to claim 1, wherein writing a disc category value to the optical disc further comprises writing, by a digital versatile disc re-writeable drive, a disc category value associated with a digital versatile disc-read only memory-type optical disc.

7. The method according to claim 6, wherein writing a disc category value associated with a digital versatile disc-read only memory-type optical disc further comprises writing a value of 0-hexadecimal to a disc category field of the optical disc.

8. The method according to claim 6, wherein writing a disc category value associated with a digital versatile disc-read only memory-type optical disc further comprises writing a disc category value of 0-hexadecimal and a version number of 1-hexadecimal to a respective disc category field and version number field of a re-writeable digital versatile disc.

9. A method of writing data to an optical disc, comprising:
    determining a disc category value to be written to an optical disc, wherein determining a disc category value further comprises supplying, by a user, an input command to an application operable to configure the optical disc drive; and
    writing, by an optical disc drive, the disc category value to the optical disc, the disc category value written to the optical disc different than a disc category value associated with a disc category type of the optical disc.

10. A computer-readable medium having stored thereon an instruction set to be executed, the instruction set, when executed by a processor, causes the processor to perform a computer method of:
    determining an optical disc category value, comprising storing an optical disc category mode configuration setting in an operating system configuration file loaded by an operating system during a computer system boot-up; and
    writing, by an optical disc drive, the disc category value to an optical disc, the disc category value written to the optical disc different than a disc category value associated with a disc category type of the optical disc.

11. The computer readable medium according to claim 10, wherein determining an optical disc category value further comprises reading a disc category mode from an operating system configuration file.

12. The computer-readable medium according to claim 10, wherein writing a disc category value to an optical disc further comprises writing the disc category value to a writeable digital versatile disc.

13. The computer-readable medium according to claim 12, wherein writing the disc category value to a writeable digital versatile disc further comprises writing, by a re-writeable digital versatile disc drive, the disc category value to a re-writeable digital versatile disc.

14. The computer-readable medium according to claim 10, wherein writing a disc category value to an optical disc further comprises writing a disc category value and version number into a control data zone of a lead-in area of the optical disc.

15. The computer-readable medium according to claim 14, wherein writing the disc category value and version number further comprises writing a disc category value associated with a digital versatile disc-read only memory-type optical disc.

16. The computer-readable medium according to claim 10, wherein the optical disc is a re-writeable digital versatile disc.

17. The computer-readable medium according to claim 10, wherein writing a disc category value to an optical disc further comprises writing a disc category value of 0-hexadecimal to a disc category field of a re-writeable digital versatile disc.

18. The computer-readable medium according to claim 10, wherein writing a disc category value to an optical disc further comprises writing a disc category value of 0-hexadecimal and a version number of 1-hexadecimal to a respective disc category field and version number field of a re-writeable digital versatile disc.

19. A method of writing data to an optical disc, comprising:
    writing, by an optical disc drive, a value to a disc category field of an optical disc, the disc category filed indicative of a read/write characteristic of the optical disc, the value written to the disc category field of the optical disc different than a value corresponding to the read/write characteristic of the optical disc; and
    receiving, by the optical disc drive, a selection of a disc category overwrite mode of operation to facilitate writing the value to the optical disc different than the value corresponding to the read/write characteristic of the optical disc.

20. The method of claim 19, wherein writing the value comprises writing, to a re-writeable optical disc, a value corresponding to a read-only memory type of optical disc.

21. A computer system, comprising:
an optical disc drive configured to write a value to a disc category field of an optical disc, the disc category field indicative of a read/write characteristic of the optical disc, the value written to the disc category field of the optical disc different than a value corresponding to the read/write characteristic of the optical disc,
wherein the optical disc drive is selectable between a conventional mode of operation and a disc category overwrite mode of operation, the conventional mode of operation usable to write a value to the disc category field corresponding to the read/write characteristic of the optical disc.

22. The system of claim 21, wherein the disc category overwrite mode of operation is usable to write the value different than a value corresponding to the read/write characteristic of the optical disc.

23. The system of claim 21, wherein the optical disc drive is configured to write to a re-writeable optical disc a value corresponding to a read-only memory type of optical disc.

* * * * *

UNITED STATES PATENT AND TRADEMARK OFFICE
CERTIFICATE OF CORRECTION

PATENT NO. : 7,532,553 B2
APPLICATION NO. : 10/335318
DATED : May 12, 2009
INVENTOR(S) : David H. Hanes It is certified that error appears in the above-identified patent and that said Letters Patent is hereby corrected as shown below:

In column 8, line 58, in Claim 19, delete "filed" and insert -- field --, therefor.

Signed and Sealed this

Twentieth Day of October, 2009

David J. Kappos
*Director of the United States Patent and Trademark Office*